June 3, 1958  A. R. SCHOLIN  2,837,239
METERING PUMP
Filed July 28, 1955  2 Sheets-Sheet 1
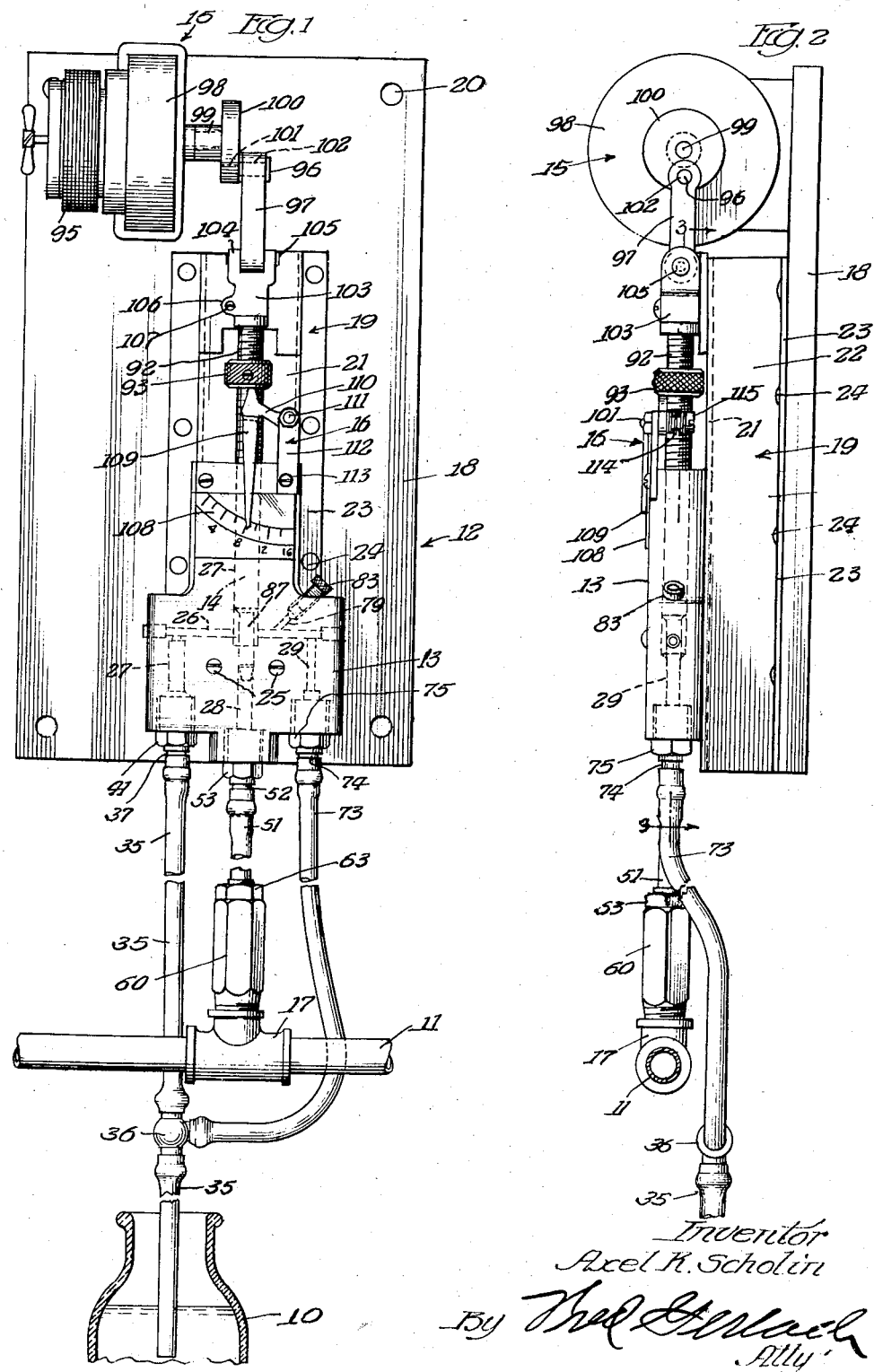
Inventor
Axel R. Scholin June 3, 1958 — A. R. SCHOLIN — 2,837,239
METERING PUMP
Filed July 28, 1955 — 2 Sheets-Sheet 2
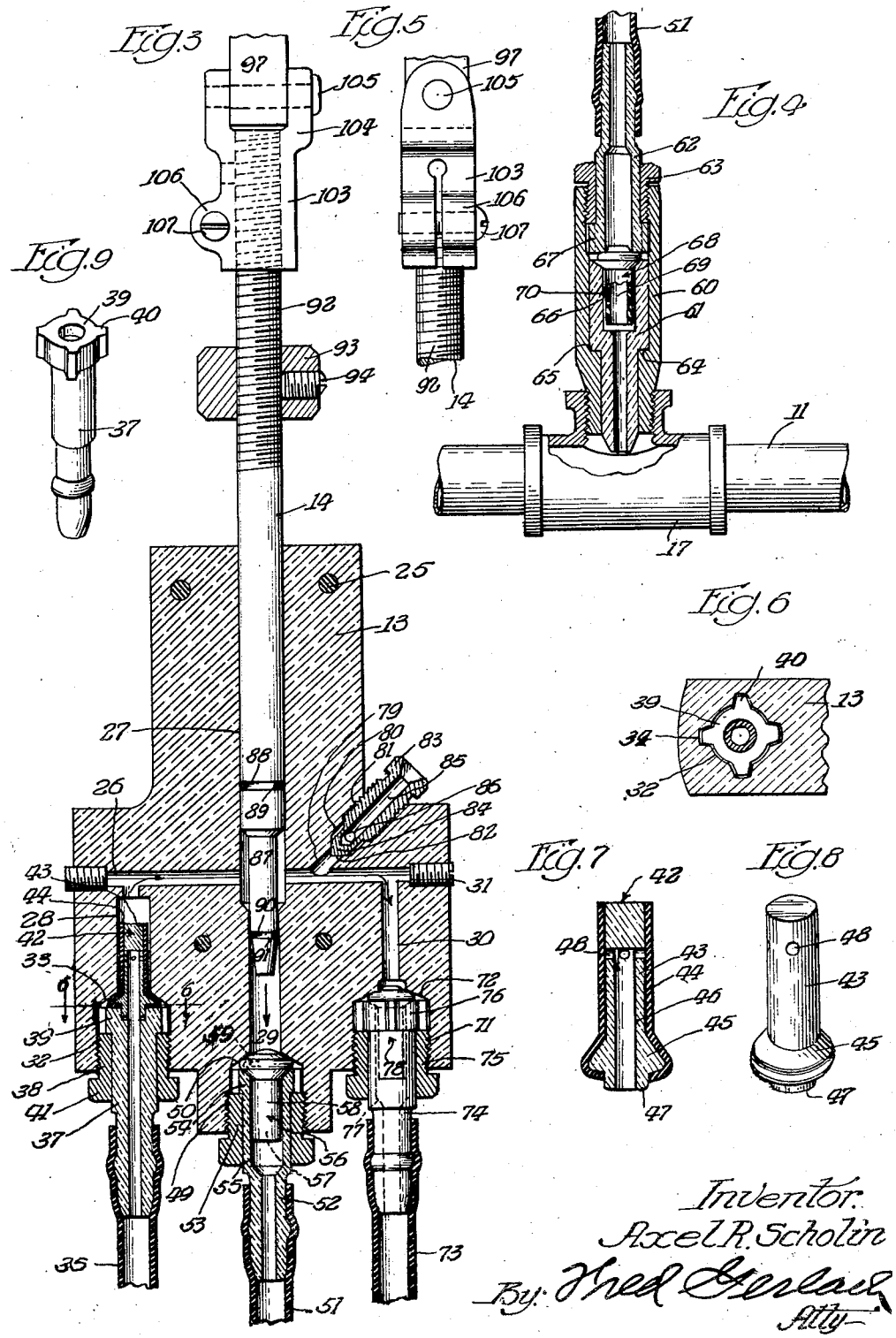
Inventor.
Axel R. Scholin
By Fred Gerlach
Atty.

United States Patent Office

2,837,239
Patented June 3, 1958

2,837,239

METERING PUMP

Axel R. Scholin, Chicago, Ill.

Application July 28, 1955, Serial No. 524,934

11 Claims. (Cl. 222—41)

The present invention relates generally to metering pumps. More particularly, the invention relates to that type of metering pump which is designed primarily, in connection with use thereof, to introduce measured quantities of purifying liquid, such, for example, as chlorine, into water in transit through a pipe leading to a storage tank, and as its principal parts or components comprises: (1) a body which is formed of a block of solid material and has formed therein a cross duct with closed ends, a bore having one end thereof open to atmosphere and its other end extending across and a slight distance beyond the cross duct, an inlet duct having one end thereof in intersecting relation with the cross duct and its other end provided with an inlet type check valve and adapted to be connected by a conduit to a source of purifying liquid, a discharge duct of materially less diameter than the bore and having one end thereof in coaxial and intersecting relation with the inner end of the bore and its other end provided with an outlet type check valve and adapted to be connected by a conduit to the water pipe, and an overflow duct having one end thereof in intersecting relation with the cross duct and its other end provided with an outlet type check valve and adapted to be connected by a conduit to the source of purifying liquid; (2) a plunger which is slidably mounted in the bore, has on its inner end a reduced, longitudinally extending stem for sliding movement into and out of the receiving or inner end of the discharge duct, and is adapted when slid outwards to draw the purifying liquid into the cross duct via the inlet duct and the inlet type check valve and conduit therefor and when slid inwards to force a portion of the purifying liquid in the cross duct outwards through the discharge duct and the outlet type check valve and conduit therefor and into the water pipe and also to force an additional portion of the purifying liquid in the cross duct outwards through the overflow duct and the outlet type check valve and conduit therefor back to the source of purifying liquid; and (3) motor driven mechanism for repeatedly reciprocating the plunger, that is, sliding the plunger inwards and outwards with respect to the body.

One object of the invention is to provide a metering pump which is an improvement upon, and has certain inherent advantages over, previously designed pumps of the same general type and is characterized by extremely high efficiency, simplicity of design and low cost of manufacture.

Another object of the invention is to provide a metering pump of the type under consideration in which the cross duct, the bore, the inlet duct, the discharge duct, and the overflow duct are formed and arranged in a novel manner and the check valves which are associated with the inlet, discharge and outlet ducts, respectively, are of simple and improved construction.

Another object of the invention is to provide a metering pump of the type under consideration in which the body is formed of transparent plastic material in order that the pumping action of the plunger may be readily viewed.

Another object of the invention is to provide a metering pump of the aforementioned type and character in which the body is provided with simple and novel means for priming the cross duct.

Another object of the invention is to provide a metering pump of the aforementioned character in which the mechanism for reciprocating the plunger imparts to the plunger a fixed stroke of predetermined length and consists of a gear head type electric motor, a crank pin in connected relation with the driven member of the motor, and a pitman between the crank pin and the outer end of the plunger.

Another object of the invention is to provide a metering pump of the last mentioned character in which the connection between the pitman and the outer end of the plunger is adjustable in such manner that the plunger may be adjusted towards or away from the pitman in order to vary as desired the amount of pumpage of the plunger in connection with each in-stroke of the plunger.

Another object of the invention is to provide a metering pump of the type and character under consideration in which the mechanism for reciprocating the plunger has associated with it a simple scale and pointer arrangement for indicating the amount of pumpage for which the plunger is adjusted.

A further object of the invention is to provide a metering pump of the aforementioned type in which the conduit between the discharge end of the discharge duct and the water pipe has an outflow type check valve at its discharge end in order that there are two outflow type check valves between the discharge duct and the water pipe and hence, due to the resistance of such check valves, no purifying liquid flows through the discharge duct until the reduced stem on the inner end of the plunger enters the receiving end of the discharge duct.

A still further object of the invention is to provide a metering pump which is generally of new and improved construction, involves a novel arrangement of parts, and effectively and efficiently fulfills its intended purpose.

Other objects of the invention and the various advantages and characteristics of the present metering pump will be apparent from a consideration of the following detailed description.

The invention consists of the several novel features which are hereinafter set forth and are more particularly defined by the claims at the conclusion hereof.

In the drawings which accompany and form a part of this specification or disclosure and in which like numerals of reference denote corresponding parts throughout the several views:

Figure 1 is a front elevation of a metering pump embodying the invention;

Figure 2 is a side elevation of the pump;

Figure 3 is an enlarged vertical section taken on line 3—3 of Figure 2 and illustrating in detail the arrangement of the cross duct, the bore, and the inlet, discharge and overflow ducts in the body of the pump;

Figure 4 is a vertical section illustrating in detail the manner in which the discharge end of the conduit for the outlet duct is connected to the water pipe and also showing the construction and design of the outflow type check valve that is associated with the discharge end of the aforesaid conduit;

Figure 5 is a side view of the adjustable connection between the pitman and the outer end of the plunger;

Figure 6 is a horizontal section taken on line 6—6 of Figure 3;

Figure 7 is a longitudinal section of the inflow type check valve which is located at the receiving end of the inlet duct;

Figure 8 is a perspective of a part of the check valve that is shown in Figure 7; and Figure 9 is a perspective of one of the three coupling sleeves which serve to connect the inlet, discharge and overflow ducts to their respective conduits.

The metering pump which is shown in the drawings constitutes the preferred form or embodiment of the invention. It is designed or adapted to pump a purifying liquid such, for example, as chlorine, from a container 10 and to force measured quantities of the liquid into water in transit through a pipe 11 which leads to a storage tank (not shown). As its principal parts or components, the pump comprises a mounting structure 12, a body 13, a plunger 14, a mechanism 15 for reciprocating the plunger, and a scale and pointer arrangement 16 for indicating the amount of pumpage in connection with each in-stroke of the plunger. As shown in Figure 1, the container 10 is located beneath the mounting structure 12 and contains a supply of the purifying liquid that is to be pumped. The water pipe 11 extends horizontally and includes a T-fitting 17, the intermediate branch of which extends upwards and is internally threaded.

The mounting structure 12 of the metering pump consists of a vertically extending rectangular plate 18 and a vertically extending sheet metal channel-shaped bracket 19. The plate 18 of the mounting structure is adapted to be placed against a wall (not shown) and has at the corners thereof holes 20 for receiving screws or similar attaching devices. The bracket 19 is located substantially midway between the side edges of the plate 18 and consists of an intermediate web 21 and a pair of right angle, inwardly extending side legs 22 along the side margins of the intermediate web. The inner or free side margins of the legs 22 are provided with integral, outwardly extending right angle flanges 23 which fit against the outer surface of the plate 18 and are secured in place by way of rivets 24 or other attaching devices. As shown in Figure 1, the upper end of the bracket 19 of the mounting structure 12 terminates an appreciable distance below the upper edge of the plate 18.

The body 13 of the metering pump is in the form of an inverted T-shaped block and fits against the lower end portion of the intermediate web 21 of the channel-shaped bracket 19. It is formed of any suitable transparent plastic material such, for example, as "Lucite" and is fixedly secured in place by way of horizontal bolts 25 which extend through registering holes in the body and the intermediate web of the bracket. As best shown in Figure 3, the body 13 of the metering pump has formed therein a horizontally extending cross duct 26, a vertically extending bore 27, a vertically extending inlet duct 28, a vertically extending discharge duct 29, and a vertically extending overflow duct 30. The cross duct 26 extends completely and longitudinally through the upper portion of the lower cross part of the inverted T-shaped body 13. It is in the form of a drilling and has its ends closed by way of screw plugs 31. The bore 27 extends downwards through the upstanding stem part of the body 13 and is centrally positioned with respect to the body. The upper end of the bore is open and the lower end of the bore extends across, and projects a small distance beneath, the central portion of the cross duct 26. The diameter of the bore 27 is materially greater than the diameter of the cross duct. The vertically extending inlet duct 28 is formed in the lower left hand corner of the cross part of the inverted T-shaped body 13 and has its upper end in intersecting or communicating relation with the left hand end of the cross duct 26, as viewed in Figure 3. The lower end of the inlet duct is in the form of an internally threaded counter bore 32, the lower end of which is open and extends through the bottom face of the body 13 and the upper end of which is defined by a downwardly facing frusto-conical shoulder 33. The internally threaded counter bore 32 that constitutes the lower end of the inlet duct 28 has four longitudinally extending grooves 34 which, as shown in Figure 6, are arranged at right angles to one another. The lower end of the inlet duct 28 communicates with the container 10 by way of a plastic hose-like conduit 35. The lower or receiving end of the conduit 35 extends into the container 10 and has interposed therein a T-fitting 36. The upper end of the conduit 35 is connected to the lower end of the inlet duct 28 by way of a vertically extending coupling sleeve 37 and an externally threaded ring nut 38. The coupling sleeve is formed of "Lucite" or any other suitable non-corrosive plastic type material and has the lower end thereof tapered downwardly and fitting snugly within the upper end of the conduit 35. The upper end of the coupling sleeve 37 embodies an enlarged head 39 which fits within the upper end of the internally threaded counter bore 32 and has four outwardly extending ribs 40 which fit within the upper ends of the longitudinally extending grooves 34 and coact therewith to prevent the coupling sleeve 37 from turning relatively to the body 13. The externally threaded ring nut 38 extends around the upper central portion of the coupling sleeve 37 and is in screw threaded relation with the internally threaded counter bore 32 constituting the lower end of the inlet duct 28. It is adapted when tightened to urge the coupling sleeve 37 upwards towards the shoulder 33 and embodies at its lower end an outwardly extending polygonal flange 41 whereby it may be gripped by a wrench or other turning tool. Disposed within the inlet duct 28 is an inflow type check valve 42. The latter consists of an elongated, vertically extending member 43 and a surrounding sleeve 44 of elastic material such as "neoprene" or "Thiocol." The elongated member 43 is formed of suitable plastic material such as Lucite and is disposed for the most part in the upper end portion of the inlet duct 28. It embodies at its lower end an integral, outwardly extending annular flange 45 which is positioned between the downwardly facing shoulder 33 and the upper end of the enlarged head 39 on the upper end of the coupling sleeve 37 and has a frusto-conical upper surface and a substantially flat lower surface. The diameter of the member 43 exclusive of the flange 45 is materially less than the diameter of the upper end of the inlet duct 28. The elongated member 43 of the check valve 42 is provided in its central and lower end portions with a centrally disposed, longitudinally extending duct 46. The lower end of the duct is open and communicates with the upper end of the interior of the coupling sleeve 37. The lower end of the elongated member 43 is provided with a depending pilot stem 47 which fits within a counter bore 48 in the upper end of the coupling sleeve 37 and coacts therewith to hold the check valve 42 against lateral displacement with respect to the coupling sleeve. The upper end of the longitudinally extending duct 46 is closed but communicates with the inner ends of an annular series of radially extending discharge ports 48. The sleeve 44 extends tightly around the elongated member 43 and is in slightly spaced relation with respect to the upper end of the inlet duct 28. The lower end of the sleeve 44 extends around the annular, outwardly extending flange 45 on the lower end of the elongated member as shown in Figure 7. The portion of the lower end of the sleeve that extends around the frusto-conical upper surface of the flange is clamped against the downwardly facing shoulder 33, and the portion of the lower end of the sleeve that extends over the substantially flat lower surface of the flange 45 abuts against the top surface of the enlarged head 39 on the upper end of the coupling sleeve 37. When suction is created in the cross duct 26 in response to upward sliding movement of the plunger 14, the upper end portion of the sleeve 44 flexes outwards and permits purifying liquid to flow from the container 10 into the cross duct via the conduit 35, the coupling sleeve 37, the longitudinally extending duct 46, the discharge ports 48, and the upper end of the inlet duct 28. When pressure is created in the cross duct 26 in connection with downward sliding movement of the plunger 14 the upper portion of the sleeve 47 is caused to collapse or contract around the elongated member 43 so as to seal the outer ends of the discharge ports 48 and thus prevent back flow of the purifying liquid through the check valve 42, the coupling sleeve 37 and the conduit 35. The vertically extending discharge duct 29 is formed in the central portion of the cross part of the inverted T-shaped body 13 and is of materially less diameter than the bore 27. The upper end of the discharge duct is in coaxial and intersecting relation with the lower end of the bore and the lower end of the discharge duct is in the form of an internally threaded counter bore 49, the lower end of which is open and extends through the bottom face of the body 13 and the upper end of which is defined by a downwardly facing frusto-conical shoulder 50. The internally threaded counter bore 49 has four longitudinally extending grooves like the grooves 34. The lower end of the discharge duct 29 communicates with the water pipe 11 by way of a plastic hose-like conduit 51 which, as shown in Figure 1, extends downwards from the body 13 to the water pipe. The upper or receiving end of the conduit 51 is connected to the lower end of the discharge duct 29 by way of a vertically extending coupling sleeve 52 and an externally threaded ring nut 53. The coupling sleeve 52 embodies at its upper end an enlarged rib-equipped head 54 and is exactly the same in design and construction as the coupling sleeve 37 except that it is provided in its upper end portion with a counter bore 55. The lower end of the coupling sleeve 52 is tapered downwardly and fits snugly within the upper end of the conduit 51. The enlarged rib-equipped head 54 on the upper end of the coupling sleeve 52 fits within the upper end of the internally threaded counter bore 49. The externally threaded ring nut 53 extends around the upper central portion of the coupling sleeve 52 and is in screw threaded relation with the internally threaded counter bore 49 constituting the lower or discharge end of the discharge duct 29. It is the same in design and construction as the ring nut 38 and is adapted when tightened to urge the coupling sleeve 52 upwards towards the downwardly facing shoulder 50. Disposed within the lower end of the discharge duct 29 is an outflow type check valve 56. The latter is exactly the same as the check valve 42 except that it is reversely positioned. It comprises an elongated, vertically extending member 57 and a surrounding sleeve 58 of elastic material. The elongated member 57 is disposed for the most part within the counter bore 55 in the upper end portion of the coupling sleeve 52 and embodies at its upper end an integral, outwardly extending annular flange 59 which is interposed between the downwardly facing shoulder 50 and the head 54 on the upper end of the coupling sleeve 52. The elastic sleeve 58 of the outflow type check valve 56 extends tightly around the elongated member 57 and is clamped between the downwardly facing shoulder 50 and the upper end of the enlarged head 54 on the upper end of the elongated member 57. The elongated member 57 embodies a longitudinally extending duct (not shown) and an annular series of radially extending discharge ports (also not shown) at the lower end of the duct. When pressure is created in the cross duct 26 in response to downward sliding movement of the plunger 14 the lower portion of the sleeve 58 flexes outwards and permits the pumped purifying liquid to flow from the discharge duct 29 into the water pipe 11 via the longitudinal duct and ports in the elongated member 57 of the check valve 56, the coupling sleeve 52 and the conduit 51. When suction is created in the cross duct 26 in connection with upward sliding movement of the plunger 14 the lower portion of the elastic sleeve 58 is caused to collapse or contract around the elongated member 57 and hence prevents upflow of the purifying liquid through the outflow type check valve 56. The lower end of the conduit 51 is connected to the upwardly extending intermediate branch of the T-fitting 17 by way of a vertically extending outer sleeve 60, a vertically extending inner sleeve 61, a vertically extending coupling sleeve 62 and an externally threaded ring nut 63 (see Figure 4). The outer sleeve 60 is preferably formed of metal and has a reduced, externally threaded lower end which fits within, and is in screw threaded relation with, the upwardly extending intermediate branch of the T-fitting 17. The central portion of the outer sleeve 60 is provided with an upwardly facing, interiorly disposed shoulder 64 and the upper end of the outer sleeve is provided with an internal screw thread which has four longitudinally extending grooves (not shown) like the grooves 34. The inner sleeve 61 is disposed within the central and lower portions of the outer sleeve and has on the central portion thereof a downwardly facing shoulder 65 which abuts against the upwardly facing shoulder 64. The upper end portion of the inner sleeve is provided with a counter bore 66. Preferably the inner sleeve 61 is formed of "Lucite" or any other suitable non-corrosive plastic type material. The vertically extending coupling sleeve 62 is exactly the same in design and construction as the sleeve 52 except that it is reversely positioned. The upper end of the coupling sleeve 62 is upwardly tapered and fits snugly within the lower end of the flexible, hose-like conduit 51. The lower end of the coupling sleeve 62 is provided with an integral, enlarged, rib-equipped head 67 which fits within the upper end of the outer sleeve 60 and surmounts the upper end of the inner sleeve 61. The externally threaded ring nut 63 extends around the lower central portion of the coupling sleeve 62 and is in screw threaded relation with the upper end of the outer sleeve 60. Disposed within the upper end of the inner sleeve 61 is an outflow type check valve 68. The latter is exactly the same as, and functions like, the outflow check valve 56 and consists of an elongated, vertically extending member 69 and an elastic sleeve 70 around the member. The upper end of the elongated member 69 is provided with an integral, outwardly extending annular flange which is interposed between the enlarged head 67 on the lower end of the coupling sleeve 62 and the upper end of the inner sleeve 61. The outflow type check valve 68 presents upflow of liquid through the conduit 51 in connection with the suction stroke of the plunger 14. In addition, it coacts with the outflow type check valve 56 to provide such resistance that during the initial part of the down stroke of the plunger 14, the displaced purifying liquid in the cross duct 26 flows downwards through the overflow duct 30, as hereinafter described more in detail. The vertically extending overflow duct 30 is formed in the lower right hand corner of the cross part of the inverted T-shaped body 13 and has its upper end in intersecting or communicating relation with the right hand end of the cross duct 26, as viewed in Figure 3. The lower end of the overflow duct is in the form of an internally threaded counter bore 71, the lower end of which is open and extends through the bottom face of the body 13 and the upper end of which is defined by a downwardly facing frusto-conical shoulder 72. The internally threaded counter bore 71 is longitudinally grooved in the same manner as the counter bores 32 and 49. The lower end of the overflow duct 30 is connected to the T-fitting 36 by way of a plastic hose-like conduit 73. The lower or discharge end of the conduit 73 is sleeved over the intermediate branch of the T-fitting 36, as shown in Figure 1. The upper or receiving end of the conduit 73 is connected to the lower end of the overflow duct 30 by way of a vertically extending coupling sleeve 74 and an externally threaded ring nut 75. The coupling sleeve 74 is exactly the same in design and construction as the coupling sleeve 52 and embodies at its upper end an integral, enlarged, rib-equipped head 76 which fits within the upper end of the counter bore 71 and is disposed directly beneath the downwardly facing frusto-conical shoulder 72. The lower end of the coupling sleeve 74 is downwardly tapered and fits snugly within the upper end of the hose-like conduit 73. The externally threaded ring nut 75 extends around the upper central portion of the coupling sleeve 74 and is in screw threaded relation with the internally threaded counter bore 71 constituting the lower end of the overflow duct 30. The upper end portion of the coupling sleeve is provided with a counter bore 77. Disposed for the most part within said counter bore is a downflow type check valve 78. The latter is exactly the same in construction and mode of operation as the downflow type valve 56 at the lower end of the discharge duct 29. It consists of an elongated, vertically extending member and an elastic sleeve in surrounding relation with the member and is arranged so that the annular, outwardly extending flange on the upper end of the member is interposed between the downwardly facing frusto-conical shoulder 72 and the enlarged, rib-equipped head 76 on the upper end of the coupling sleeve 74. When pressure is created in the cross duct 26 in response to downward sliding movement of the plunger 14, the lower end portion of the elastic sleeve of the downflow type check valve 78 flexes outwards and permits the overflow purifying liquid in the cross duct 26 to flow back to the container 10 via the overflow duct 30, the check valve 78, the coupling sleeve 74, the conduit 73, and the T-fitting 36. When suction is created in the cross duct 26 in connection with upward sliding movement of the plunger 14, the lower end portion of the elastic sleeve of the check valve 78 collapses or contracts around the elongated member of such check valve and thus prevents upflow of purifying liquid through the conduit 73. In order to provide for priming of the cross duct 26, the body 13 of the metering pump is provided with a diagonally extending duct 79. The latter is formed in the central right hand portion of the body 13, as viewed in Figure 3, and has the lower end thereof in intersecting or communicating relation with the portion of the cross duct 26 that is between the bore 27 and the overflow duct 30. The central portion of the priming duct 79 is in the form of a cylindrical counter bore 80 and the outer end portion of said priming duct is in the form of a larger sized, internally threaded counter bore 81. The lower end of the counter bore 80 is defined by an upwardly facing frusto-conical shoulder 82. The priming duct 79 is normally closed by an elongated, externally threaded screw 83. The latter is in screw threaded relation with the internally threaded bore 81 and embodies at its lower end an integral, reduced stem 84. Such stem normally fits within and is of less diameter than the cylindrical counter bore 80 and has its lower end tapered in conformity with the upwardly facing frusto-conical shoulder 82. The screw 83 embodies in its central and upper end portions a longitudinally extending drill-form passage 85. The upper end of such passage is open and the lower end of the passage terminates within the reduced stem 84 and communicates with a pair of diametrically opposite, outwardly extending ports 86. The latter are formed in the inner end portion of the reduced stem 84 and communicate with the cylindrical bore 80. When the screw 85 is tightened to its fullest extent, the tapered lower end of the reduced stem 84 seats against the frusto-conical shoulder 82 and hence closes or seals the priming duct 79. When screw 83 is loosened to a limited extent, the tapered end of the reduced stem 84 is in spaced relation with respect to the shoulder 82. Consequently, any priming liquid which is introduced into the upper end of the passage 85 flows into the cross duct 26 via the discharge ports 86, the cylindrical counter bore 80 and the lower end of the priming duct 79.

The plunger 14 of the metering pump extends vertically and has the lower end portion thereof mounted slidably in the bore 27. The lower extremity of the plunger is provided with an integral, reduced, longitudinally extending stem 87 which in connection with down and up sliding movement of the plunger slides into and out of the upper end of the discharge duct 29. The portion of the plunger 14 that is directly above the upper end of the stem 87 is provided with an annular groove 88 in which is mounted an elastic sealing ring 89. The stem 87 has the lower end thereof tapered downwards and is provided directly above its tapered lower extremity with an annular groove 90 in which is mounted an elastic sealing ring 91. It is contemplated that on each up stroke of the plunger, the plunger will slide upwards such a distance as to effect complete withdrawal of the lower end of the reduced stem 87 from the upper end of the discharge duct 29 and that in connection with the down stroke of the plunger, the plunger will slide such a distance as to cause the lower end of the reduced stem to move into the upper end of the discharge duct. When the plunger 14 slides upwards in connection with its up stroke, suction is created within the cross duct 26. As soon as suction is created within the cross duct, purifying liquid from the container 10 flows upwards into the cross duct via the conduit 35, the coupling sleeve 37, the inflow type check valve 42, and the inlet duct 28. In connection with initial downward sliding movement of the plunger, that is, downward sliding of the plunger until the lower end of the stem 83 enters the upper end of the discharge duct 29, the excess purifying liquid in the duct 26 is returned to the container 10 via the overflow duct 30, the outflow type check valve 78, the coupling sleeve 74, the conduit 73, and the T-fitting 36. During completion of the down stroke of the plunger, the lower end of the reduced stem 87 slides downwards in the upper end of the discharge duct 29 and displaces the purifying liquid in the discharge duct so that it flows into the water pipe 11 via the discharge duct 29, the outflow type check valve 56, the coupling sleeve 52, the conduit 51, the coupling sleeve 62, the outflow type check valve 68, and the inner sleeve 65. The two check valves 56 and 68 combine to produce greater resistance than the downflow type check valve 78 in the overflow duct 30. No purifying liquid flows downwards through the discharge duct 29 until in connection with final downward sliding movement of the plunger 14, the lower end of the reduced stem 87 enters the upper end of the discharge ducts and causes a positive displacement of the purifying liquid in the discharge duct. The upper end of the plunger 14 extends an appreciable distance above the top face of the body 13 and embodies an external screw thread 92. A collar 93 is mounted on the exposed upper end of the plunger and is provided with a radially extending set screw 94 whereby it is fixedly secured in place. The outer periphery of the collar is knurled in order that it may be readily gripped in connection with turning of the plunger.

The mechanism 15 for reciprocating the plunger comprises a gear head type electric motor 95, a crank pin 96, and a pitman 97. The electric motor 95 is mounted on the upper end of the plate 18 of the mounting structure 12 and is arranged so that the armature shaft thereof extends horizontally. One end of the motor embodies a housing 98 in which speed reducing gears (not shown) are mounted. The driven gear within the housing 98 is mounted on the inner end of a horizontally extending shaft 99 which extends through an opening in the outer end wall of the housing 98. The outer end of the shaft 99 is provided with a concentric, vertically extending disk 100. The crank pin 96 of the plunger reciprocating mechanism 15 extends horizontally and has one end thereof mounted fixedly in an eccentric hole 101 in disk 100. As shown in Figures 1 and 2, the crank pin 96 is positioned a small distance above the upper end of the plunger 14. The pitman 97 extends between the crank pin 96 and the upper end of the plunger 14 and operates to reciprocate the plunger during drive of the electric motor 95. The upper end of the pitman is provided with a hole 102 through which the outer end of the crank pin extends loosely. The lower end of the pitman 97 is operatively and pivotally connected to the upper end of the plunger 14 by way of a vertically extending, longitudinally split sleeve 103. The upper end of the sleeve is bifurcated and consists of a pair of upwardly extending, spaced apart furcations 104. The latter are arranged in straddled relation with the lower end of the pitman 97 and are pivotally connected thereto by way of a horizontal pin 105. The latter is horizontally disposed and extends through registering holes in furcations 104 and the lower end of the pitman 97. The sleeve 103 surrounds the upper extremity of the plunger 14 and is internally threaded so that it is in screw threaded relation with said upper extremity of the plunger. The screw threaded connection between the sleeve 103 and the upper extremity of the plunger permits the plunger to be adjusted towards or away from the pitman in order to vary the amount of pumpage of the plunger in connection with each down stroke of the plunger. When the plunger is turned so that it feeds upwards towards the pitman, the amount of pumpage is decreased, and when the plunger is reversely turned so as to feed it downwards away from the pitman, the amount of pumpage is increased. It is contemplated that vertical adjustment of the plunger will be effected by turning the knurled collar 93. The portions of the sleeve 103 that define the longitudinal split are provided with a pair of integral, outwardly extending, spaced apart ears 106. A clamp screw 107 extends through a hole in one of the ears into an internally threaded socket in the other ear and serves, when tightened, to contract the sleeve into fixed relation with the upper extremity of the plunger. When it is desired vertically to adjust the plunger with respect to the pitman, the clamp screw 107 is loosened. Upon loosening of the clamp screw, the sleeve expands and hence permits turning of the plunger for adjustment purposes. After proper adjustment of the plunger, the clamp screw will be tightened so as fixedly to maintain the upper end of the plunger in connected relation with the sleeve. The longitudinally split sleeve 103 exemplifies simple means for permitting the plunger to be adjusted towards or away from the pitman in order to vary as desired the amount of pumpage of the plunger.

The scale and pointer arrangement 16 for indicating the amount of pumpage in connection with each down stroke of the plunger 14 is located at the upper end of the body 13 and consists of an arcuate or curved scale 108 and a pivotally mounted pointer 109. The scale 108 is fixedly mounted on the upper portion of the front surface of the stem part of the inverted T-shaped body 13 and is calibrated in numbers so as to indicate the number of drops of purifying liquid that are pumped in connection with each down stroke of the plunger, depending upon the vertical adjustment of the plunger with respect to the pitman 97. The pointer 109 of the arrangement 16 is arranged in an upstanding position and so that the upper end thereof directly underlies, and is engaged by, the collar 93 at the conclusion of the down stroke of the plunger 14. It embodies at its upper end a rigid, laterally extending arm 110, the outer end of which is pivotally mounted on a horizontally extending pivot pin 111 on the upper end of a vertically extending bracket 112. The lower end of such bracket is connected to the upper right hand corner of the stem part of the inverted T-shaped body 13 by way of a screw 113 or other suitable attaching device. The pivot pin 111 on the upper end of the bracket 112 permits the pointer 109 to swing laterally, that is, back and forth with respect to the scale 108. When the pointer is set so that the upper end thereof is engaged by the collar 93 when the plunger 14 reaches the end of its down stroke, the numeral that is on the scale and adjacent to the pointed lower end of the pointer indicates the number of drops that are pumped in connection with each down stroke of the plunger. The pointer 109 is yieldingly held in its various adjusted positions by way of a spiral compression spring 114. The latter extends around the horizontally extending pivot pin 111 and has one end thereof in abutment with a head 115 on one end of the pivot pin and its other end in abutment with the proximal end of the arm 110. The spring 115 serves to urge the proximal end of arm 110 against the upper end of the bracket 112 to the end that the arm and pointer are frictionally held in their different adjusted positions. When it is desired to increase the amount of pumpage to say, for example, 12 drops per stroke of the plunger, the crank pin 102 is rotated manually until it is in its lowermost position and hence the plunger is at the end of its down stroke. Thereafter the clamp screw 107 is loosened and the plunger is turned so as to feed it downwards with respect to the pitman 97. In connection with downward feed of the plunger, the collar 93 swings the pointer 109 in a counterclockwise direction, as viewed in Figure 1. As soon as the lower end of the pointer moves opposite to the numeral 12 on the scale 108, turning of the plunger is stopped and then the plunger is locked in place by tightening the clamp screw 107. If it is desired to decrease the amount of pumpage, the crank pin 102 is manipulated into its lowermost position and then after loosening the clamp screw 107, the plunger is turned so as to shift it upwards with respect to the pitman. In connection with upward adjustment of the plunger, the pointer 109 is swung manually in a clockwise direction so that the upper end thereof follows the collar 93. As soon as the lower end of the pointer reaches the desired number on the scale, turning of the plunger is stopped and then the plunger is locked or secured in place by tightening the clamp screw 107, as previously pointed out.

The herein described metering pump effectively and efficiently fulfills its intended purpose, consists of but a comparatively small number of parts, and is readily adjustable so far as the amount of pumpage is concerned. It may be readily primed and, due to the construction and arrangement of its parts, is capable of being produced at a comparatively low cost. By connecting the lower end of the conduit 73 to the T-fitting 36, the overflow liquid that flows through said conduit tends to prime the conduit 35 which extends between the container 10 and the lower end of the inlet duct 28.

Whereas the metering pump has been described as being designed or adapted to pump a purifying liquid into water in transit through a pipe, it is to be understood that the pump has other capabilities of use and may be used for pumping measured quantities of a liquid other than a water purifying liquid. It is also to be understood that the invention is not to be restricted to the details set forth since they may be modified within the scope of the appended claims without departing from the spirit or scope of the invention.

Having thus described the invention what I claim as new and desire to secure by Letters Patent is:

1. A metering pump adapted to draw treating liquid from a source and introduce it under pressure and in measured quantities into a different liquid in transit through a pipe and comprising: a block-like body having formed therein a cross duct with closed ends, a bore providing a pumping cylinder and intersecting the cross duct and extending a short distance therebeyond, an inlet duct having one end thereof in communication with the cross duct, provided with an inlet type check valve and embodying means at its other end for connecting it to the source, a discharge duct of less diameter than the bore, having one end thereof in coaxial communication with said projecting end of the bore and embodying at its other end an outlet type check valve and means for connecting it to the pipe, and an overflow duct having one end thereof in communication with the cross duct and embodying at its other end an outlet type check valve and means for connecting it to said source; a plunger mounted slidably in the pumping cylinder, provided on the inner end thereof with a reduced longitudinally extending stem movable into said one end of the discharge duct to cut off communication between the discharge duct and cross bore, and adapted when slid outwards to draw treating liquid from the source into the cross duct via the first mentioned connecting means, the inlet type check valve and the inlet duct and when slid initially inwards to force a portion of the treating liquid from the cross duct back to the source via the overflow duct, the second mentioned outlet type check valve and the third mentioned connecting means, and thereafter when said stem moves into said one end of the discharge duct to force a portion of the treating liquid entrapped in the discharge duct into the pipe via the first mentioned outlet type check valve and the second mentioned connecting means, and power-driven means for reciprocating the plunger.

2. A metering pump according to claim 1 and in which the body is formed of transparent plastic material.

3. A metering pump according to claim 1 and in which the body is vertically elongated, the cross duct extends longitudinally, is formed in the central portion of the body and is closed at its ends by plugs, the bore extends vertically and is formed in the upper and central portions of the body, and the inlet, discharge and overflow ducts extend downwards from the cross duct and are formed in the lower portion of the body.

4. A metering pump according to claim 1 and in which said one end of the inlet, discharge and overflow ducts are in the form of internally threaded counterbores with spaced apart longitudinally extending grooves therein and with shoulders at their inner ends, and the connecting means for said inlet, discharge and overflow ducts embodying coupling sleeves having certain ends thereof disposed in the counterbores and provided with enlarged heads that are positioned adjacent to the shoulders and have outwardly extending ribs in interfitting relation with said grooves, and also embodying externally threaded ring nuts extending around the coupling sleeves and arranged in screw threaded relation with said internally threaded counterbores.

5. A metering pump according to claim 1 and in which said one ends of the inlet, discharge and overflow ducts are in the form of internally threaded counterbores with shoulders at their inner ends, the connecting means for said inlet, discharge and overflow ducts embody coupling sleeves with enlarged heads in the inner end portions of the counterbores and also embody externally threaded ring nuts extending around the coupling sleeves and arranged in screw threaded relation with said internally threaded counterbores, and the check valves for the three aforementioned ducts comprise elongated members provided at certain ends thereof with outwardly extending annular flanges interposed between the aforesaid shoulders and the heads on the coupling sleeves, and embodying longitudinally extending ducts with certain ends thereof extending through said certain ends of the members and their other ends terminating inwards of the other ends of the members and annular series of outwardly extending discharge ports extending between said other ends of the longitudinally extending ducts and the outer peripheries of said members, and also comprise elastic sleeves that extend snugly around the members and have the ends thereof that surround the flanges clamped between the shoulders and said heads on the coupling sleeves.

6. A metering pump according to claim 1 and wherein the body has a priming duct leading to the cross duct and provided with screw type means for normally closing the priming duct.

7. A metering pump adapted to draw treating liquid from a source and introduce it under pressure and in measured quantities into a different liquid in transit through a pipe and comprising: a block-like body having formed therein a cross duct with closed ends, a bore providing a pumping cylinder and intersecting the cross duct and extending a short distance therebeyond, an inlet duct having one end thereof in communication with the cross duct, provided with an inlet type check valve and embodying means at its other end for connecting it to the source, a discharge duct of less diameter than the bore, having one end thereof in coaxial communication with said projecting end of the bore and embodying at its other end a first outlet type check valve, and an overflow duct having one end thereof in communication with the cross duct and embodying at its other end a second outlet type check valve and means for connecting it to said source; a conduit having one end thereof connected to said other end of the discharge duct and its other end provided with means for connection to the pipe including an outlet type check valve; a plunger mounted slidably in the pumping cylinder provided on the inner end thereof with a reduced longitudinally extending stem movable into said one end of the discharge duct to cut off communication between the discharge duct and cross bore, and adapted when slid outwards to draw treating liquid from the source into the cross duct via the first mentioned connecting means, the inlet type check valve and the inlet duct and when slid initially inwards to force a portion of the treating liquid from the cross duct back to the source via the overflow duct, the second mentioned outlet type check valve and the second connecting means, and thereafter when said stem moves into said one end of the discharge duct to force a portion of the treating liquid entrapped in the discharge duct into the pipe via the first mentioned outlet type check valve, the conduit and the third mentioned outlet type check valve, and power-driven means for reciprocating the plunger.

8. A metering pump adapted to draw treating liquid from a source and introduce it under pressure and in measured quantities into a different liquid in transit through a pipe and comprising: a block-like body having formed therein a cross duct with closed ends, a bore providing a pumping cylinder and intersecting the cross duct and extending a short distance therebeyond, an inlet duct having one end thereof in communication with the cross duct, provided with an inlet type check valve and embodying means at its other end for connecting it to the source, a discharge duct of less diameter than the bore having one end thereof in coaxial communication with said projecting end of the bore and embodying at its other end a first outlet type check valve and means for connecting it to the pipe, and an overflow duct having one end thereof in communication with the cross duct and embodying at its other end a second outlet type check valve and means for connecting it to said source; a conduit having one end thereof connected to said other end of the discharge duct and its other end provided with means for connection to the pipe including a third outlet type check valve; a plunger having one end portion mounted slidably in the pumping cylinder, provided on the inner end thereof with a reduced longitudinally extending stem movable into said one end of the discharge duct to cut off communication between the discharge duct and cross bore and adapted when slid outwards to draw treating liquid from the source into the cross duct via the first mentioned connecting means, the inlet type check valve and the inlet duct when slid initially inwards to force a portion of the treating liquid from the cross duct back to the source via the overflow duct, the second mentioned outlet type check valve and the second connecting means, and thereafter when said stem moves into said one end of the discharge duct into the pipe via the first mentioned outlet type check valve, the conduit and the third mentioned outlet type check valve; said plunger having its other end portion disposed exteriorly of the body and provided with a collar-like member in spaced relation with the body; power driven mechanism operative to reciprocate the plunger and comprising an electric motor, a crank pin connected for drive by the motor, a pitman having one end thereof connected to the crank pin, and an operating connection extending between the other end of the crank pin and the extremity of said exteriorly disposed other end portion of the plunger and constructed and arranged so that it permits the plunger to be adjusted bodily and longitudinally towards or away from the pitman in order to vary the amount of pumpage of the plunger during each of its in-strokes; and a scale and pointer arrangement adapted to indicate the quantity of pumpage of the plunger during each in-stroke thereof and comprising a calibrated, arcuate scale mounted fixedly adjacent to the exteriorly disposed other end of the plunger, an arm positioned in spaced relation with the scale provided with a friction-type pivot at one end thereof, and a pointer mounted by way of the arm to swing back and forth along the scale and having one end thereof positioned adjacent to the scale and its other end connected to the distal end of said arm and arranged and adapted to be engaged by said collar-like member when the plunger reaches the end of its in-stroke.

9. A metering pump according to claim 8 and in which the operating connection of the plunger reciprocating mechanism is so constructed and arranged that it permits the plunger to be adjusted bodily and longitudinally towards or away from the pitman in order to vary the amount of pumpage of the plunger during each of its in-strokes.

10. A metering pump according to claim 8 and in which the exteriorly disposed end portion of the plunger is externally threaded, and the operating connection of the plunger reciprocating mechanism is in the form of an internally threaded sleeve which extends around, and is in screw threaded relation with, said exteriorly disposed end portion of the plunger to the end that when the plunger is turned in one direction or the other with respect to the sleeve it is bodily and longitudinally adjusted to or from the piston and thus results in a variation in the amount of pumpage of the plunger during each of its in-strokes.

11. A metering pump according to claim 8 and in which the scale is mounted on the body at a location adjacent to the open one end of the bore, and the pivot for the pointer-carrying arm is subjected to friction by way of a spring.

References Cited in the file of this patent

UNITED STATES PATENTS

| | | |
|---|---|---|
| 774,326 | Kelly | Nov. 8, 1904 |
| 1,687,007 | Cornwall et al. | Oct. 9, 1928 |
| 2,166,169 | Martin | July 18, 1939 |
| 2,530,682 | Coldsnow | Nov. 21, 1950 |